United States Patent [19]

Jacobsen

[11] Patent Number: 4,461,112
[45] Date of Patent: Jul. 24, 1984

[54] APPARATUS FOR USE IN FISHING

[76] Inventor: Kevin N. Jacobsen, Ellistrin Lodge, Roundstone, Ireland

[21] Appl. No.: 308,447

[22] Filed: Oct. 5, 1981

[51] Int. Cl.³ .................... A01K 91/00; A01K 97/06
[52] U.S. Cl. .......................................... 43/4; 43/57.3
[58] Field of Search .......................... 43/4, 27.4, 57.3

[56] References Cited

U.S. PATENT DOCUMENTS

| 2,778,142 | 1/1957 | Berry | 43/27.4 X |
| 3,841,011 | 10/1974 | Tison | 43/57.3 X |
| 4,266,359 | 5/1981 | Alex | 43/57.3 X |
| 4,354,323 | 10/1982 | Huff | 43/57.3 X |

FOREIGN PATENT DOCUMENTS

| 141284 | 5/1951 | Australia | 43/4 |
| 71712 | 2/1947 | Norway | 43/4 |
| 102350 | 8/1963 | Norway | 43/6.5 |
| 104806 | 9/1964 | Norway | . |
| 117155 | 7/1969 | Norway | 43/57.3 |

Primary Examiner—Nicholas P. Godici
Assistant Examiner—Thomas S. Mieczkowski
Attorney, Agent, or Firm—Thomas R. Morrison

[57] ABSTRACT

Apparatus for handling a fishing line having hooks spaced apart along it, such as is used in "long line" fishing, as the line is hauled in from the sea, comprises a rail-member, means for hauling the line in a direction at an angle to the rail-member and a guide-member which is engaged by successive hooks of the line as it is hauled, to guide the hooks into engagement with the rail-member, whereby the movement of the line at an angle to the rail-member causes the hooks to slide along the rail-member so as to separate them from the line and feed them towards a storage rail.

15 Claims, 7 Drawing Figures

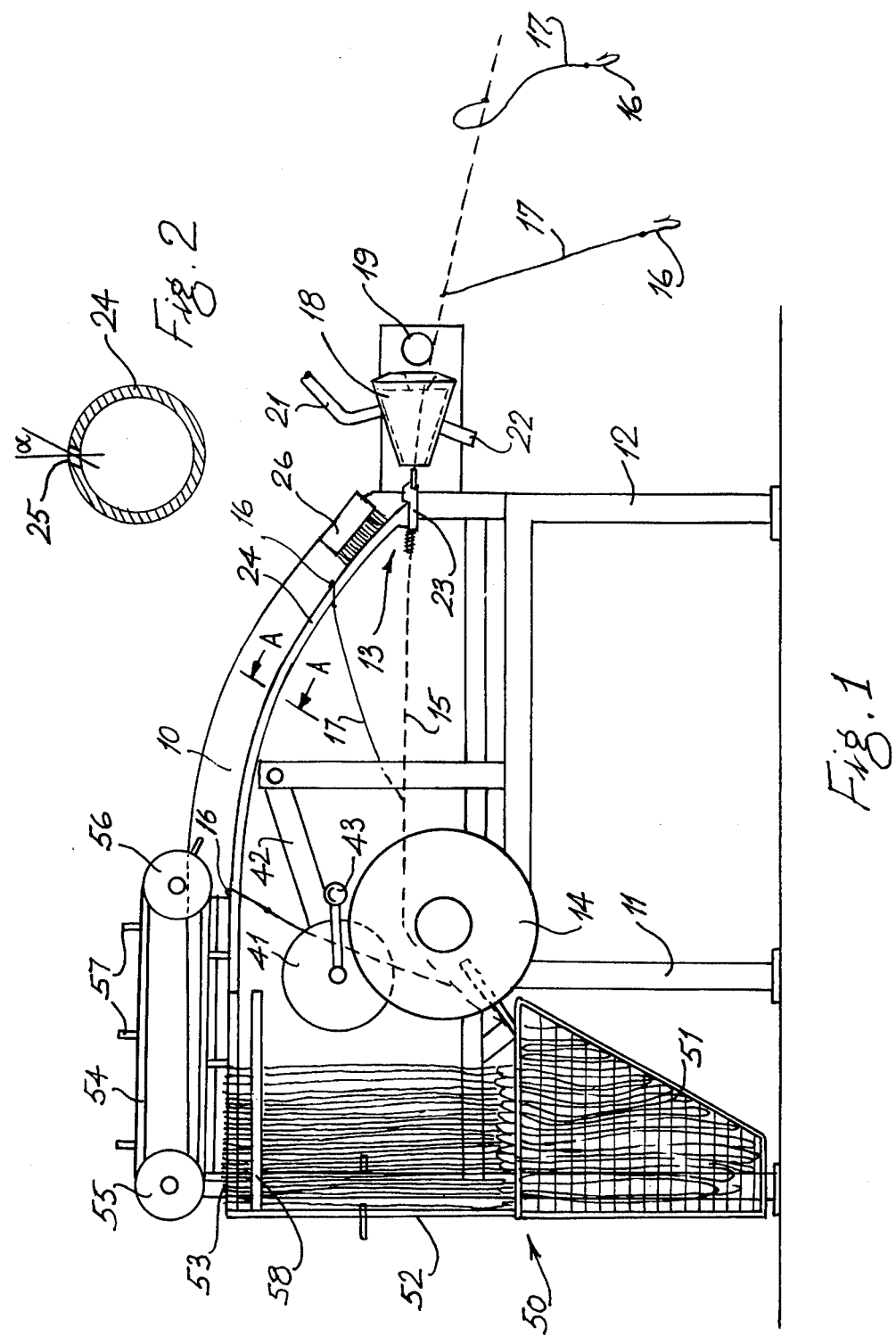

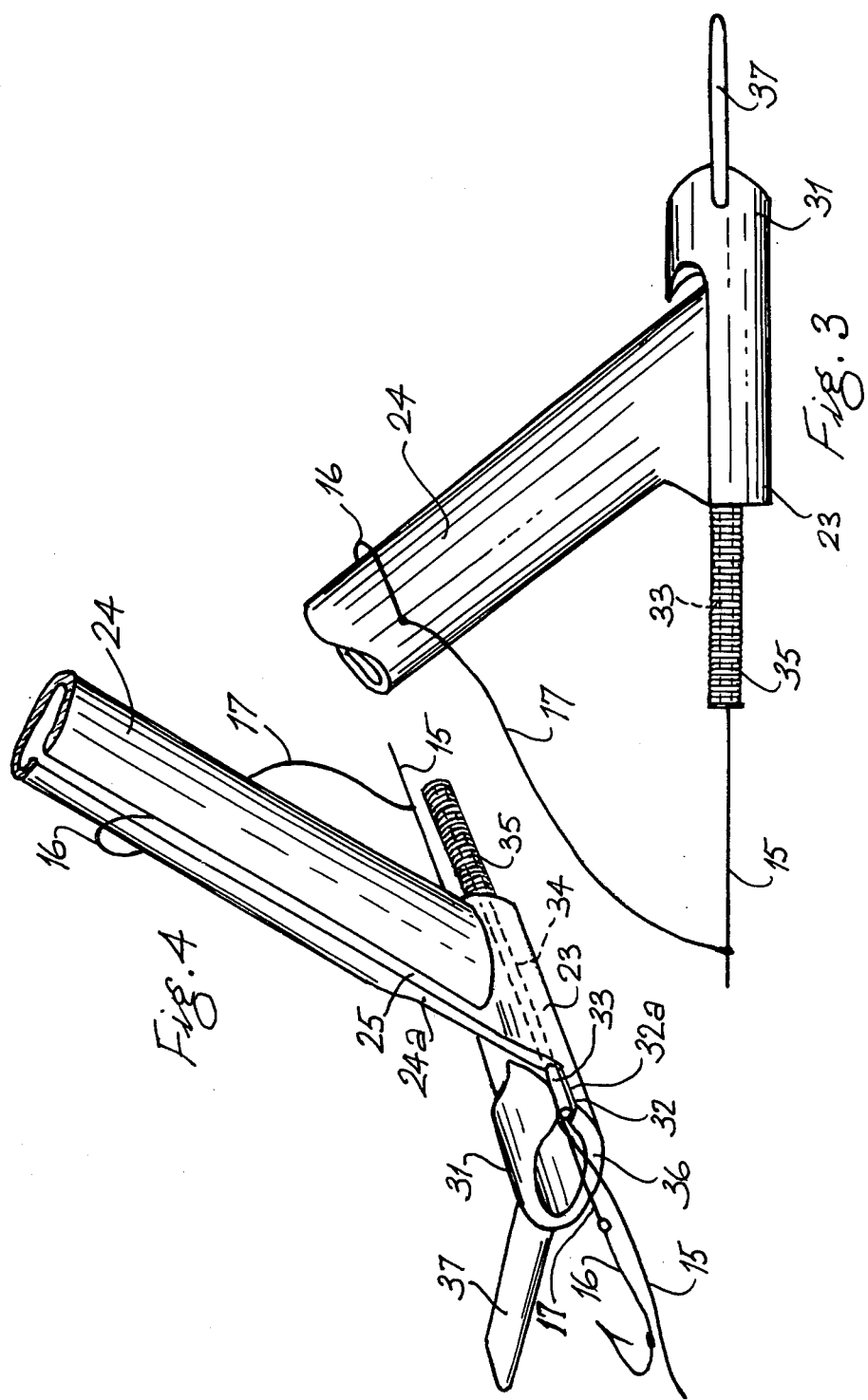

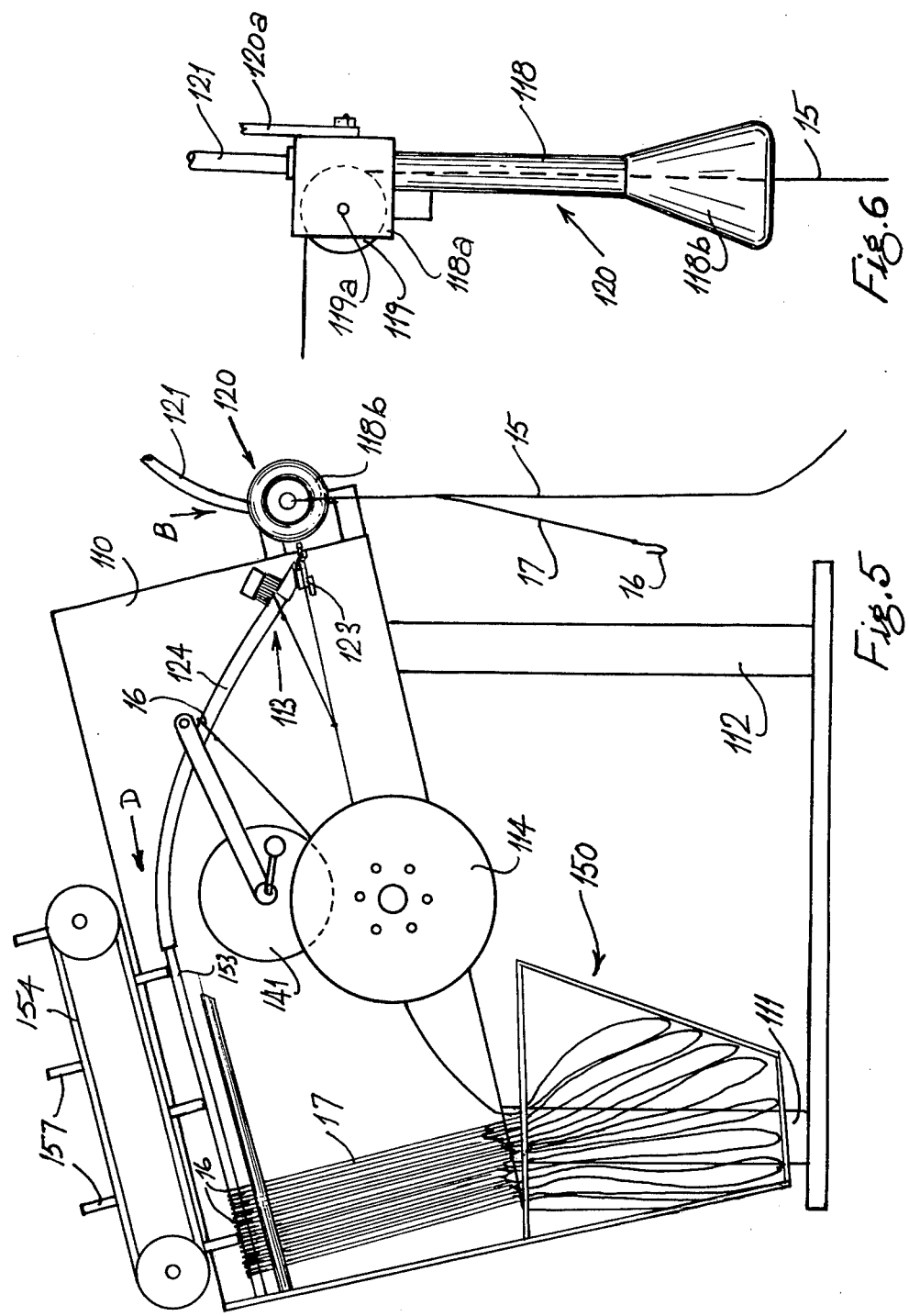

APPARATUS FOR USE IN FISHING

BACKGROUND AND SUMMARY OF THE INVENTION

This invention relates to apparatus for use in "long line" fishing, that is to say fishing such as may be carried out with sea-going fishing vessels, using a line having hooks spaced apart along it. Such fishing lines have the hooks attached to the main line by short trailing lengths of line called "snoods". Lines of this kind are used for catching white-fish such as cod, ling, ray, turbot, plaice and haddock.

The bait-material used when fishing for white-fish is usually cut-up pieces of mackerel or herring, and the baitpieces have to be attached to the individual hooks. In my U.S. Pat. No. 4,250,648, there are described a method and apparatus which make it possible for a fishing line of the above-mentioned kind to be baited in a continuous operation as it is paid out from the fishing vessel. The baited line may conveniently be paid out from the stern of the vessel as the vessel moves forward, the distal end of the line being anchored to the seabed by means of a suitable anchor.

Subsequently the line with the catch thereon has to be taken up from the seabed. This is done with the distal end of the line still anchored on the seabed, and with the vessel moving forward towards the anchor-point and hauling in the line as it goes. As the line is hauled in, the fish may be removed from the hooks and the hooks cleaned, before feeding the line to a magazine for storage prior to a further fishing operation.

In conjunction with the baiting apparatus, in my aforesaid patent specification there is also described a particularly effective storage arrangement for fishing lines of the above-mentioned kind, in which the hooks are engaged with a rail, so that the snoods hang down below the hooks, in closely spaced side-by-side relationship, and the main line is suspended from the snoods in looped formation. This arrangement minimizes the possibility of tangling during storage, and ensures that when the line is required for further use, it can be fed to the baiting apparatus in an orderly and trouble-free manner.

When a fishing line which has been hauled in from the sea is fed to such an arrangement, the snoods carrying the respective hooks have to be unravelled from the main line and the individual hooks have to be separated and engaged with the rail, this operation being referred to as "splitting". If carried out manually, splitting is an extremely tedious and time-consuming operation.

The principal object of the invention is therefore to provide apparatus which will enable the operation of separating the hooks to be carried out mechanically.

A further and more specific object of the invention is to provide apparatus for separating hooks of a fishing line of the kind mentioned above, the apparatus comprising a rail-member, means for hauling a fishing line in a direction extending at an angle to the rail-member and a guide-member adapted to be engaged by successive hooks of such a fishing line being hauled by the hauling means, and to guide the hooks into engagement with the rail-member, whereby as the fishing line is hauled relatively to the rail-member, hooks engaged with the rail-member are caused to slide along the latter so as to separate them from the main line.

As the fishing line is hauled, due to the fact that it is moving in a direction extending at an angle to the rail-member, as the individual hooks slide along the rail-member, they move away from the main line, the snoods which attach the hooks to the main line meanwhile executing a pivotting movement relatively to the main line, and in this way the separating or "splitting" action is effected in a continuous operation.

While the arrangement is such that at the point where the hooks are brought into engagement with the rail-member, the line is moving in a direction extending at an angle to the rail-member, preferably the rail-member is itself curved in such a way that sliding movement of the hooks along it, causes the snoods to pivot into a position in which finally they extend substantially perpendicular to the direction of movement of the main line, so as to complete the splitting operation.

The guide-member may conveniently be of generally tubular form, so that a fishing line passes through the guide-member as the hooks are guided into engagement with the rail-member. Preferably the guide-member is in the form of a tube which is split lengthwise thereof and is arranged with its longitudinal axis extending at an angle to the rail-member so that a fishing line being hauled by the hauling means passes through the tubular guide-member in the direction of the said longitudinal axis thereof. The split tubular guide-member may define at one end face thereof, a slot extending radially relatively to the said end face, one edge of the slot being contiguous with the rail-member, whereby the slot serves to guide successive hooks of a fishing line passing through the guide-member, into engagement with the rail-member. A spring-loaded plunger may be provided in the slot, to control entry of successive hooks into the slot.

The guide-member and the rail-member together constitute the splitting device proper, and they may conveniently be of unitary construction. The line-hauling means may conveniently comprise a drive-sheave rotated by a hydraulic motor and as will be seen from the more detailed description given hereinafter, the whole apparatus including the hydraulically operated line-hauling means and the splitting device can be constructed as a compact self-contained unit. For ease of cleaning, it is desirable for as many as possible of the components of the apparatus (and in particular the guide-member and rail-member constituting the splitting device as referred to above) to be made from stainless steel.

BRIEF DESCRIPTION OF THE DRAWINGS

The invention will now be more fully described, by way of example only, with reference to the accompanying drawings. In the drawings:

FIG. 1 is a general view of one form of hauling and splitting unit, viewed in side elevation;

FIG. 2 is a fragmentary cross-sectional view on the line A—A of FIG. 1, drawn to a larger scale so as to show a detail;

FIG. 3 is a fragmentary view showing the splitting device which forms part of the apparatus of FIG. 1, drawn to a larger scale;

FIG. 4 shows the device of FIG. 3 in perspective view, as seen from the rear (i.e. the side which is obscured in FIG. 1);

FIG. 5 is a view corresponding to FIG. 1 but showing a modified form of hauling and splitting unit, in side elevation;

FIG. 6 is a fragmentary plan view in the direction of the arrow B in FIG. 5, showing the device which can be seen at the right-hand end of FIG. 5 and drawn to a slightly larger scale;

DESCRIPTION OF THE PREFERRED EMBODIMENTS

Figure 7:
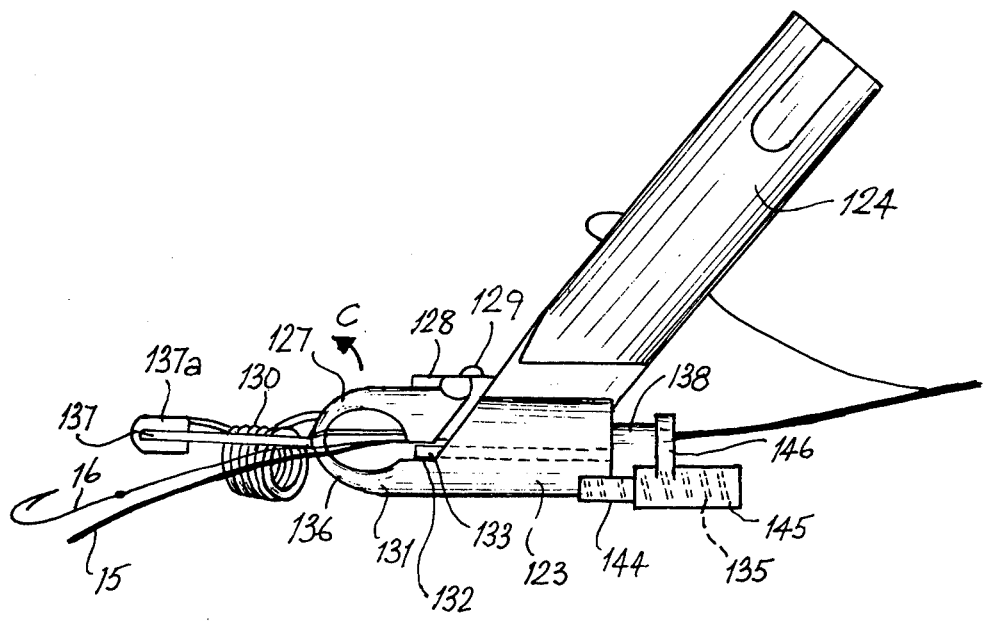
FIG. 7 is a fragmentary view showing the splitting device which forms part of the apparatus in FIG. 5 viewed from the rear (i.e. from the side which is obscured in FIG. 5).

Referring to FIG. 1, the apparatus shown therein serves for hauling a fishing line in from the sea. As the line is hauled inboard, fish are stripped from the hooks before the hooks reach the apparatus shown in FIG. 1.

The component parts of the hauling and splitting unit are carried by a mounting panel 10 supported by uprights 11,12. The components mounted on the panel 10 include splitting device 13 and hydraulically driven line-hauling sheave 14. The sheave 14 draws the fishing line incoming from the sea through the apparatus in a generally horizontal direction. As previously described, the fishing line comprises a main line 15 having hooks 16 spaced apart along it and attached thereto by snoods 17. So that it can be clearly distinguished, the main line 15 is indicated in FIG. 1 by a dash-line.

After the fish have been stripped from the hooks and before reaching the splitting device 13, the line incoming from the sea passes by way of a device 18 which ensures that the snoods and hooks are properly aligned before being presented to the splitting device. The device 18 comprises a conical funnel-member arranged with its axis horizontal. The line passes axially through the member 18, entering by way of the larger diameter end and emerging by way of the smaller diameter end. As it enters the larger diameter end of the funnel-member 18, the line 15 bears against a transverse guide roller 19 which ensures that the line entering the funnel-member is correctly aligned relatively to the axis thereof. The pulling action exerted on the line 15 to draw it through the funnel-member 18 ensures that the funnel-member is effective to unravel any twisted snoods and to align the snoods 17 and hooks 16 correctly in relation to the main line 15.

A high-pressure water-pump (not shown) supplies water to the interior of the funnel-member 18 by way of a hose 21, in the form of high-pressure jets which serve to clean the line and the hooks as they are drawn through the funnel-member. Used water is discharged from the funnel-member by way of outlet 22.

The splitting device 13 includes a guide-member 23 of part-tubular form through which the line 15 passes in the direction of the longitudinal axis thereof. A rail-member 24 is mounted to extend upwardly away from the generally horizontal path of the line 15, at an angle thereto. The line 15 is drawn forward by the action of the hydraulically driven sheave 14 and the hooks 16 are fed to the rail 24 by the guide-member 23 which is located at the leading end of the rail 24, where the hooks are presented to the rail. Forward movement of the line causes the individual hooks 16 to be pulled along the rail 24 in a sliding movement. Due to the fact that the rail is inclined upwardly away from the main line 15, the hooks 16 are pulled upwards away from the main line, with the snoods 17 fully extended. A brush-member 26 is arranged with its bristles engaging the rail 24, the bristles serving to control the sliding movement of the hooks 16 along the rail 24.

As can be seen in FIG. 1, as well as extending at an angle to the direction of movement of the main line 15, the rail 24 is gently curved. The rail 24 is constituted by a stainless steel tube bent into the required curved formation and having a slot 25 (FIG. 2) extending lengthwise of the tube at the outside of the curve.

As can be seen from FIGS. 3 and 4, guide-member 23 is welded to the end of rail 24 so as to be unitary therewith. Guide member 23 is formed by bending a plate into the form of a tube split lengthwise thereof. The bent plate is shaped to provide a short tubular entry portion 31 arranged with its axis horizontal, so that the main line 15 can pass axially through the said entry portion. In bending the part of the plate which forms then entry portion 31, the edges of the said part of the plate are brought together so as to co-operate with one another to define a horizontally extending slot 32 to receive hooks presented thereto. Individual hooks 16 enter the slot 32 under the control of a spring-loaded plunger. This is constituted by a rod 33, and a bore 34 is formed in the plate to provide a mounting in which the rod 33 is engaged so as to be slidable endwise under the action of a biassing spring 35, with an end-portion of the rod being slidable into and out of the said slot 32.

The end face 36 of guide-member 23 which forms the rim of entry portion 31 extends in a plane which is inclined relatively to the longitudinal axis of the tubular guide-member and thus is generally elliptical. The slot 32 extends radially of the end face 36 and one edge 32a thereof is contiguous with the edge 24a of rail 24.

As previously mentioned, the line being hauled in from the sea is drawn in a substantially horizontal direction through the entry portion 31 of the guide-member 23. The individual snoods 17 are drawn into the entry portion 31 with the main line 15, and the hook 16 carried by each snood is thus drawn into engagement with the elliptical rim or end-face 36 of the tubular entry portion 31, with the shank of the hook 16 inside the entry portion 31 and with the barbed end of the hook located externally of the entry portion 31. The hook 16 then slides circumferentially around the elliptical rim 36, towards the slot 32.

At a position diametrically opposite the slot 32, there projects a fin-like member 37 having a razor-sharp edge. Any hook which comes into contact with this fin-like member 37 is deflected sharply to one side or the other and then slides towards the slot 32. Thus there is no risk of then hooks becoming snagged. Since the plane in which the rim 36 lies is inclined relatively to the axis of the entry portion 31 (in the direction away from the fin-like member 37), this assists the sliding movement of the individual hooks towards the slot 32.

As each hook 16 reaches the slot 32, it finds the slot closed by the plunger 33. However the pull on the hook is sufficient to overcome the action of the biassing spring 35. Thus the hook slides into and along the slot, under the control of the spring-loaded plunger 33.

The rim 36, the edge 32a of slot 32 and the edge 24a of rail 24 extend contiguously so as to provide a continuous guide-edge to lead hooks to the rail 24. As previously mentioned, as each hook slides around the rim of end face 36, its barb is located externally of the tubular entry portion 31 and in this position, it moves into the slot 32 in the entry portion 31. However, after sliding around the rim 36, passing through the slot 32 and entering the slot 25 of the rail 24, the barb will now be located internally of the slot 25.

As the line is drawn through the guide-member 23 in the manner described above, each snood 17 on the line is drawn in turn into the entry portion 31 and its hook is pulled into engagement with the rim 36 of the entry portion 31 and thence into mouth of the slot 32 in the latter. The hook is momentarily arrested by the plunger rod 33, which is in the position in which it closes the slot 32. However, as the line continues to move forward, the snood 17 is tensioned and exerts a pulling action on the hook 16, so that the plunger 33 is displaced against the action of its biassing spring 35 and the hook can enter the slot 32. This ensures that the hook 16 enters the slot 32 in the correct alignment and it then slides into engagement with the guide-edge 24a of the rail 24 and thence into the slot 25 in the rail 24. Meanwhile the plunger rod 33 returns to the position in which it closes the slot 32 so that the device is ready to receive the next hook.

As already mentioned, as each hook enters the slot 25 in the rail 24, its barb is now located internally of the slot 25 and in this position it slides along the slot 25 with its barb engaged inside the latter. For this purpose it has been found advantageous for the slot 25 in the rail to be formed in such a manner that as indicated in FIG. 2, the plane of the slot is not precisely radial, but subtends an acute angle $\alpha$ (say 25°) relatively to the radial plane. This ensures that the hooks 16 are retained effectively in engagement with the rail 24 and slide along it in a trouble-free manner.

As previously mentioned, the line is drawn forward through the apparatus by hauling means including the hydraulically driven sheave 14, which is driven in contact with the main line 15. Sheave 14 is driven by a hydraulic motor which is mounted behind the panel 10 (FIG. 1) and thus is not visible in the drawings. A control valve is provided for adjusting the operating speed of the hydraulic motor, so as to enable the line-hauling speed to be varied. Effective driving of the line is ensured by a counter-wheel constituted by a nylon disc 41 mounted on a spring-loaded lever-arm 42. A handle 43 is provided by means of which the disc 41 can be disengaged from the sheave 14 when required. Normally, however, the disc 41 bears against the main line under spring-pressure and holds it in driving engagement with the sheave 14.

Mounting means (not shown in detail in the drawings) are provided, so that a detachable magazine 50 can be clipped in position in the apparatus and withdrawn when a line has been fed into it. The magazine includes a basket-portion 51 made of stainless steel wire-mesh, with an upright 52 extending from basket-portion 51 and supporting a horizontal rail-member 53. When the magazine is inserted into position, rail-member 53 comes into end-to-end engagement with the curved rail 24 of the splitting device 13, so that the curved rail 24 then leads from the splitter to the rail-member 53 of the magazine. As already mentioned, forward movement of the main line 15 pulls the hooks 16 one by one along the curved rail 24 and they then slide into engagement with the rail-member 53 of the magazine. However, beyond the drive-sheave 14, the main line 15 simply drops into the basket-portion 51 of the magazine and the line 15 no longer acts to pull the hooks 16 forward. It is therefore necessary to provide means for positively driving the hooks 16 along the rail-member 53 of the magazine. Such means include a circulating belt 54 passing around two pulleys 55, 56 which are rotatable about horizontal axes above the rail-member 53 of the magazine, with one run of the belt 54 positioned immediately above the rail-member 53. Pads or flaps 57 of rubber or plastic material are secured at intervals along the belt 54. One of the pulleys 55, 56 is driven by means of a belt transmission, from the same hydraulic motor as drives the line-hauling sleeve 14.

As the belt 54 circulates, the flaps 57 engage the individual hooks 16, as they slide into engagement with the rail-member 53 of the magazine, and propel them along the rail-member 53, towards the far end of the rail-member 53, that is to say, the lefthand end as viewed in FIG. 1. As each hook 16 is propelled along the rail-member 53 in this way, it carries its associated snood 17 with it, thus ensuring that the main line 15 is packed into the magazine, commencing at the far end (i.e. the lefthand end in FIG. 1) of the basket-portion 51. The hooks come to rest side-by-side on the rail-member 53, with their snoods hanging down below the, so that rail-member 53 serves as a hook-store.

After a full magazine is removed from the apparatus, the hooks are inspected and any damaged hooks are transferred from the rail-member 53 to a further rail-member 58 mounted below the rail-member 53, so that they are readily accessible for repair. When the line is subsequently drawn out of the magazine during baiting, the repaired hooks are pulled out so that there is no possibility of tangling.

Referring now to FIG. 5, the overall arrangement of the modified form of hauling and stripping unit shown therein is generally similar to that shown in FIG. 1. The component parts of the apparatus are carried by a mounting panel 110, which in this case is supported in a somewhat inclined position on uprights 111 and 112. In a similar manner to the unit shown in FIG. 1, the panel 110 supports hydraulically driven sheave 114 and co-operating disc 141 by means of which the line is hauled in. However, the unit shown in FIG. 5 is intended to be installed on a boat with the panel 110 extending in the fore-and-aft direction (rather than across the boat). The line is hauled in from the sea over the side of the boat and therefore has to be deflected through 90° before it reaches the splitting device 113. For this purpose, after the fish have been stripped from the hooks, the line passes through a device 120 consisting of a long tubular member or pipe 118 extending from a box-like mounting portion 118a and having a conical mouth or funnel-portion 118b. A pulley 119 is freely rotatable in the portion 118a on a spindle 119a and the incoming line is hauled around the pulley so as to deflect it through 90° as required. The device 120 is carried by a bracket 120a which is mounted for pivoting movement about a horizontal axis. This enables the device 120 to be swivelled upwards and downwards through a limited arc, so as to adjust the angle of the pipe 118 relatively to the horizontal. Water under pressure is supplied to the device 120 by way of hose 121 so as to provide a high-pressure jet of water passing through the pipe 118, to clean the line and the hooks as they are drawn through the pipe. Water is ejected from the funnel-portion 118b and the angular position of the device 120 is adjusted by swivelling it upwards or downwards as referred to above, so that the jet of water is discharged over the side of the boat.

After passing around the pulley 119, the line reaches the splitting device 113 which comprises guide-member 123 and rail-member 124. The rail-member 124 is of similar construction to that shown in FIG. 1 but the guide-member 123 is somewhat modified. As shown in FIG. 7, guide-member 123 has a tubular entry portion 131 presenting an elliptical rim 136, and a fin-member 137 projects radially relatively to the rim 136. However, the semi-cylindrical upper part 127 of the tubular entry-portion 131 is made separate from the remainder of guide-member 123 and is hingedly mounted by means of a hinge 128. A lever which is not fully visible in FIG. 7 projects from the hinge 128, at 129. A coil spring 130 is connected between the lever and a lug 137a carried by fin-member 137. The spring-pressure applied to the lever normally urges part 127 into the closed position shown in FIG. 7, in which part 127 co-operates with the remainder of the guide-member 123, to define slot 132. During line-hauling, if a knot or tangle is encountered, which cannot pass through entry-portion 131, the above-mentioned lever is pivotted by hand, against the pressure of the spring 130, so that the part 127 pivots about hinge 128, in the direction of the arrow C in FIG. 7, thus opening up the slot 132 and allowing the knot or tangle to pass.

A plunger-rod 133 projects into the slot 132. At its opposite end, the plunger-rod 133 has a head 138 and spring-pressure is applied to head 138 by means of a tension-spring 135. The spring 135 is mounted inside two interfitting tubular parts 144 and 145, the part 144 being welded to the guide-member 123 and the part 145 carrying a lug 146 by means of which spring pressure is applied to the plunger-head 138, thus urging the plunger 133 into its operative position in the slot 132.

In a similar manner to that described with reference to FIG. 1, the plunger 133 controls the movement of successive hooks 16 through the slot 132 and into engagement with the rail 124. The hooks then slide along the rail towards the magazine 150.

The arrangement of the magazine 150 is similar to that described with reference to FIG. 1. However, because of the inclined disposition of the mounting panel 110, the magazine is mounted with its rail-member 153 inclined, which assists sliding movement of the hooks along the latter under the action of the flaps 157 on circulating belt 154.

If desired, the circulating belt arrangement could be dispensed with and, instead, a nozzle could be mounted on the panel 110, directing a water-jet in the direction of arrow D, so as to push the hooks along rail-member 153. Water would be supplied to the nozzle under pressure via a hose. This water-jet arrangement could also be applied to the embodiment of FIGS. 1 to 4.

I claim:

1. Apparatus for separating hooks of a fishing line of the type having a main line with said hooks spaced apart along said main line and connected thereto by snoods, comprising:

means for hauling said line in a predetermined direction;

a guide-member effective for encircling said line;

said guide-member including a tubular element having a longitudinal axis aligned with said direction;

an end face on said tubular element;

a slot in said tubular element having a length disposed generally in said direction in said guide-member;

a rail-member having an end disposed contiguous to said slot and said rail-member extending away from said slot at a predetermined angle to said direction;

said guide-member including means for permitting each of said hooks to be guided into and through said slot while its snood is drawn through said guide-member;

said rail-member including means for slideably engaging said hooks as they pass from said slot and for permitting said hooks to slide thereon, said predetermined angle being effective to separate said hooks from said main line as said line is hauled in said direction;

said end face of the tubular element extending in a plane which is inclined relatively to the longitudinal axis of the tubular element and is generally elliptical and wherein a fin-member extends radially outwards from the elliptical end face at a position diametrically opposite the slot, whereby as successive hooks of the fishing line passing through the tubular element are brought into engagement with the elliptical end face, the end face and the fin-member are effective to guide the individual hooks in one or other circumferential direction around the end face, into engagement with the slot.

2. Apparatus according to claim 1, wherein the rail-member is tubular and has a slot extending lengthwise thereof and communicating with the aforesaid slot of the guide-member, whereby successive hooks of a fishing line pass from the slot of the guide-member into engagement with the slot of the rail-member.

3. Apparatus according to claim 1, wherein the tubular element has a hingedly mounted part which is pivotable into a displaced position so as to open the slot of the tubular element when required.

4. Apparatus according to claim 3, including an operating lever connected to the said hingedly mounted part, for pivotting the latter into its displaced position, and a biassing spring connected to the lever, urging the said hingedly mounted part into its closed position.

5. Apparatus for separating hooks of a fishing line of the type having a main line with said hooks spaced apart along said main line and connected thereto by snoods, comprising:

means for hauling said line in a predetermined direction;

a guide-member effective for encircling said line;

a slot disposed generally in said direction in said guide-member;

a rail-member having an end disposed contiguous to said slot and said rail-member extending away from said slot at a predetermined angle to said direction;

said guide-member including means for permitting each of said hooks to be guided into and through said slot while its snood is drawn through said guide-member;

said rail-member including means for slideably engaging said hooks as they pass from said slot and for permitting said hooks to slide thereon, said predetermined angle being effective to separate said hooks from said main line as said line is hauled in said direction;

hinge means in said guide-member for hinging a hingedly mounted portion of said guide-member between a closed position and an open position, said closed position being effective to form said slot and said open position being effective to enlarge said slot whereby a tangle in said main line or said snoods is cleared to pass through said guide-member; and means for normally retaining said hingedly mounted portion in said closed position.

6. Apparatus according to claim 5, wherein the guide-member includes a tubular element having a longitudinal axis extending in said direction, said fishing line passing through the tubular element in said direction said tubular element including an end face, and said slot extending radially relatively to the said end face.

7. Apparatus according to claim 6, wherein said guide-member includes a spring-loaded plunger rod in said slot, said spring-loaded plunger rod being displaceable in said direction whereby said plunger rod is effective to control entry of successive hooks into said slot.

8. Apparatus according to claim 5, wherein the means for hauling include a drive-sheave for engaging a fishing line and hauling it in the said direction extending at an angle to the rail-member, and a hydraulic motor for driving the said sheave.

9. Apparatus according to claim 5, including a detachably mounted magazine positioned to receive a fishing line as it is hauled relatively to the rail-member and its hooks are spearated therefrom by sliding movement along the rail-member.

10. Apparatus according to claim 9, including a second rail-member provided as part of the said magazine and which in the mounted position of the magazine, is contiguous with the first said rail-member, so that as a fishing line is hauled by the hauling means, hooks thereof can slide from the first said rail-member, into engagement with the second said rail-member.

11. Apparatus according to claim 5, including a conical funnel-member mounted adjacent the said guide-member so that a fishing line being hauled by the hauling means is drawn axially through the said funnel-member, whereby the funnel-member serves to align the snoods carrying successive hooks of the fishing line, relatively to the main line, before the hooks engage the guide-member.

12. Apparatus according to claim 11, including jet-means for discharging water into the said funnel-member, for cleaning hooks passing through the said funnel-member.

13. Apparatus according to claim 11 or claim 12, wherein the funnel-member is mounted transversely relatively to the said rail-member and the apparatus further comprises a guide pulley to deflect the fishing line from its direction of axial movement through the said funnel-member into the said direction extending at an angle to the rail-member.

14. Apparatus according to claim 6 or 7 wherein said rail-member includes a tubular rail-member, said tubular rail-member including a second slot extending longitudinally thereof and communicating with the first-mentioned slot in said guide-member, whereby successive hooks of a fishing line pass from the first-mentioned slot to said second slot in said rail-member.

15. Apparatus according to claim 6 or 7, wherein said hingedly mounted portion includes an operating lever, said operating lever being effective for pivoting said hingedly mounted portion into said open position, and a biasing spring, said biasing spring being effective for urging said hingedly mounted portion into said closed position whereby said slot is formed.

* * * * *